No. 803,718. PATENTED NOV. 7, 1905.
H. F. SHADBOLT.
MACHINE FOR THE MANUFACTURE OF EXCELSIOR WRAPPERS AND PADS.
APPLICATION FILED NOV. 29, 1904.

8 SHEETS—SHEET 1.

Witnesses
Geo. W. Young.
George Felber.

Inventor
Helon F. Shadbolt,
By H. G. Underwood,
Attorneys

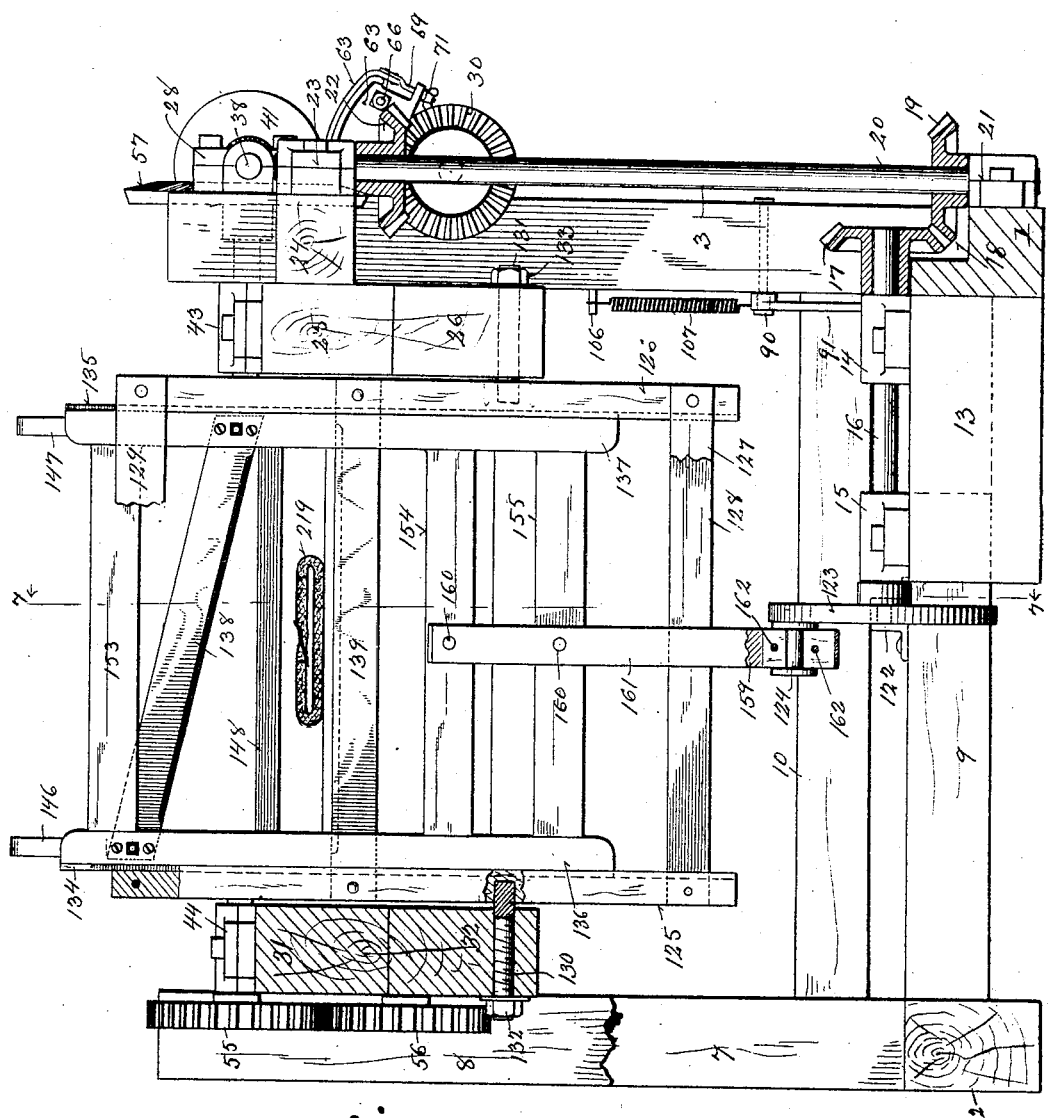

No. 803,718. PATENTED NOV. 7, 1905.
H. F. SHADBOLT.
MACHINE FOR THE MANUFACTURE OF EXCELSIOR WRAPPERS AND PADS.
APPLICATION FILED NOV. 29, 1904.
8 SHEETS—SHEET 3.
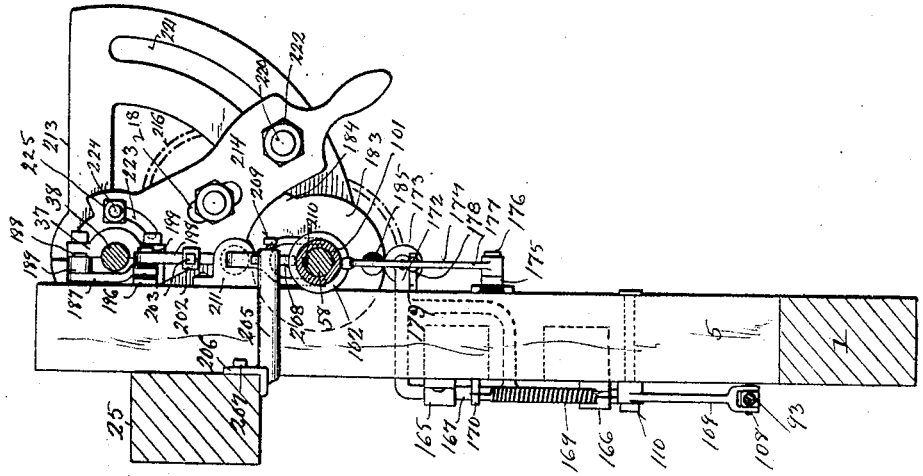
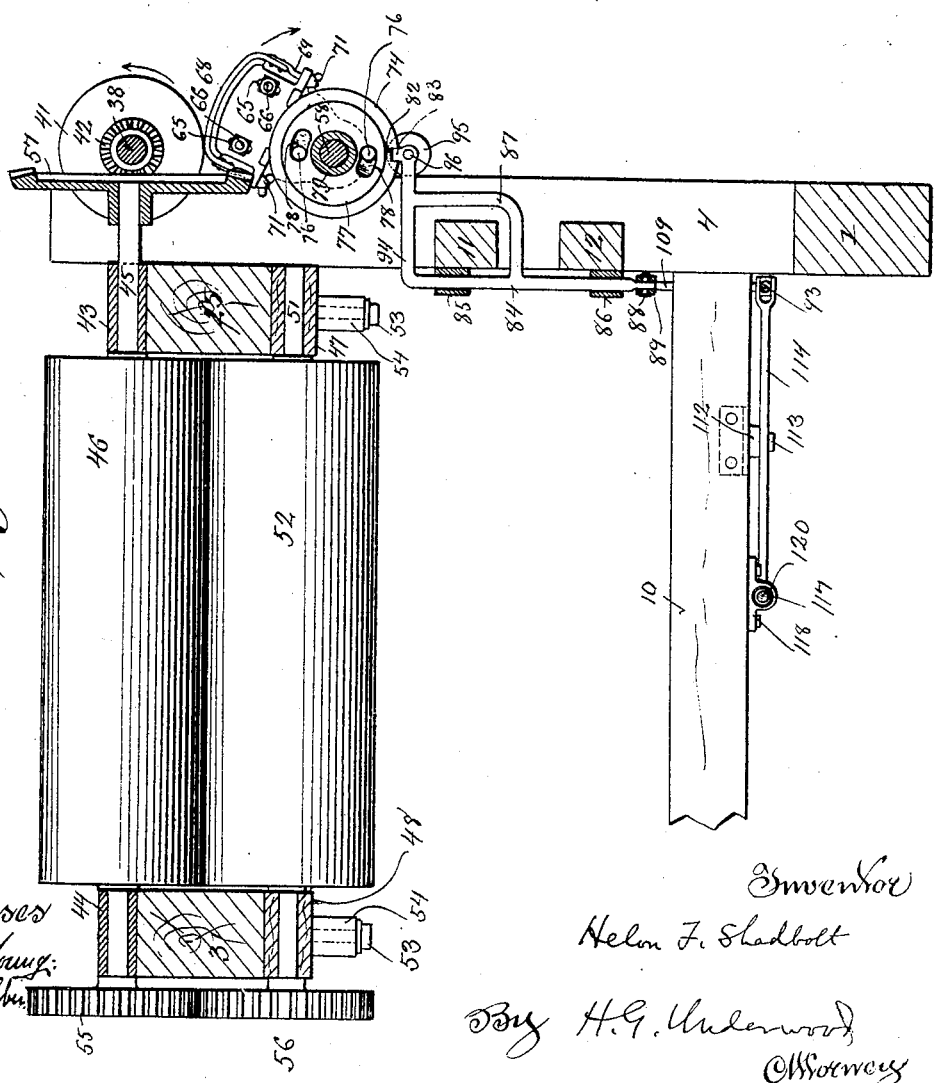

No. 803,718. PATENTED NOV. 7, 1905.
H. F. SHADBOLT.
MACHINE FOR THE MANUFACTURE OF EXCELSIOR WRAPPERS AND PADS.
APPLICATION FILED NOV. 29, 1904.
8 SHEETS—SHEET 4.
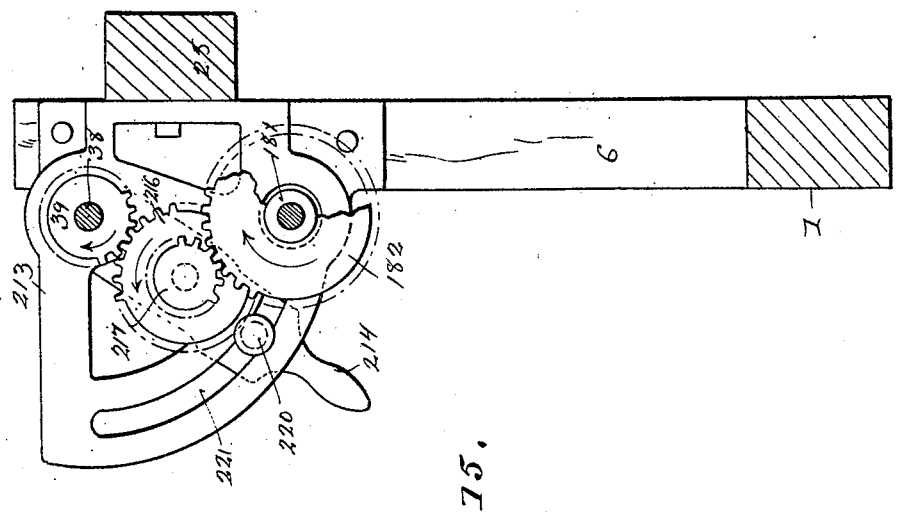
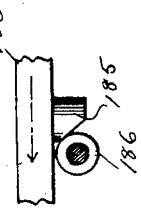
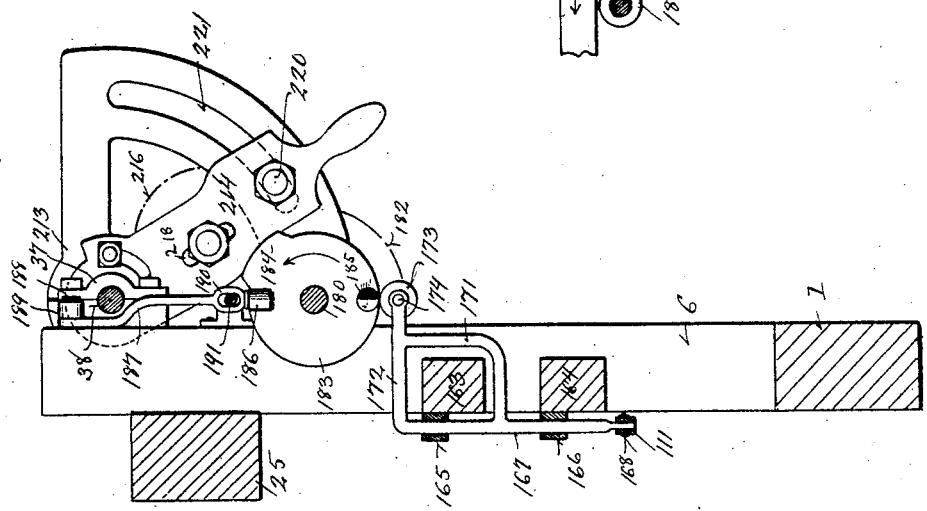
Witnesses
Geo. W. Young.
George Felber.
Inventor
Helen F. Shadbolt
By H. G. Underwood
Attorneys

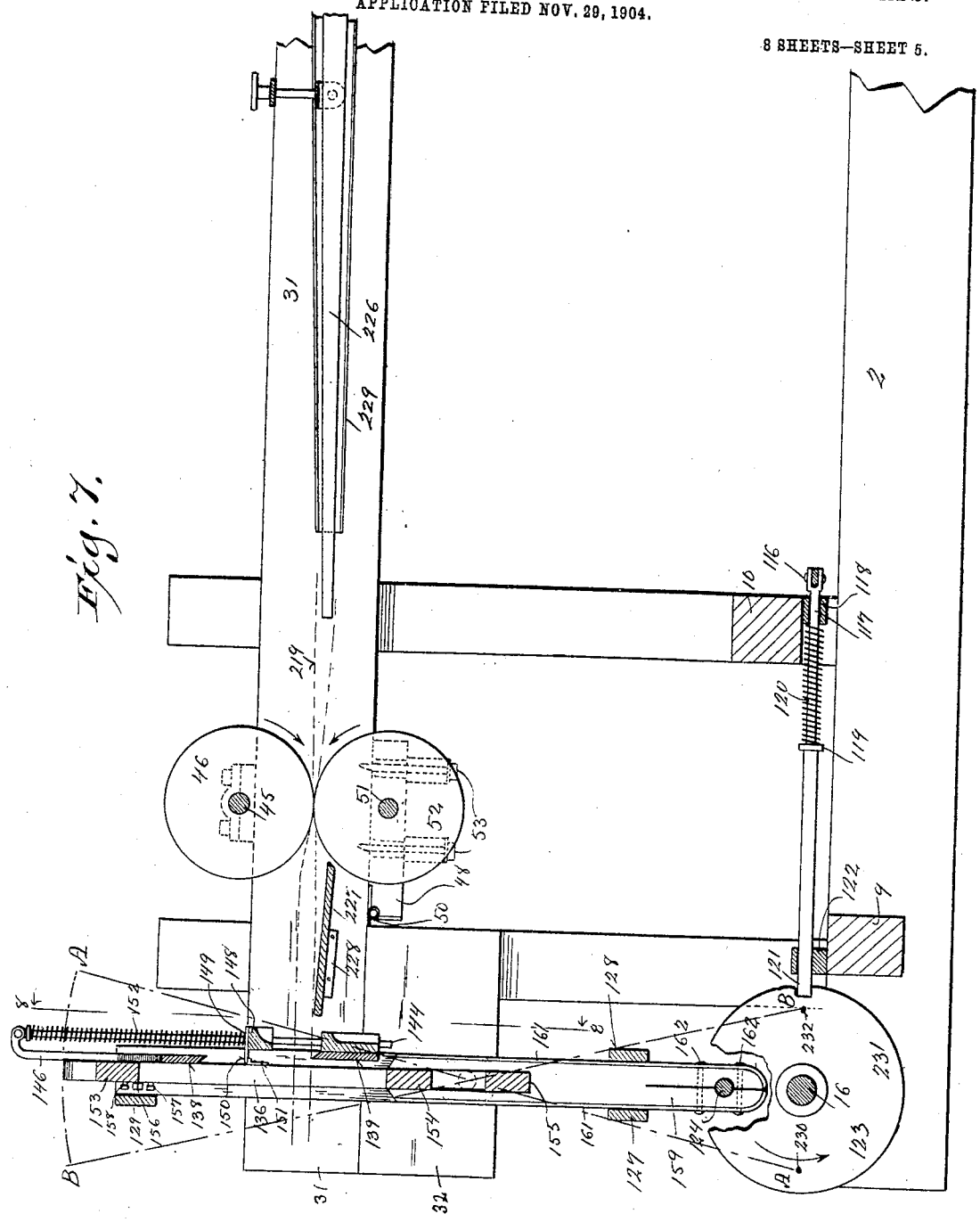

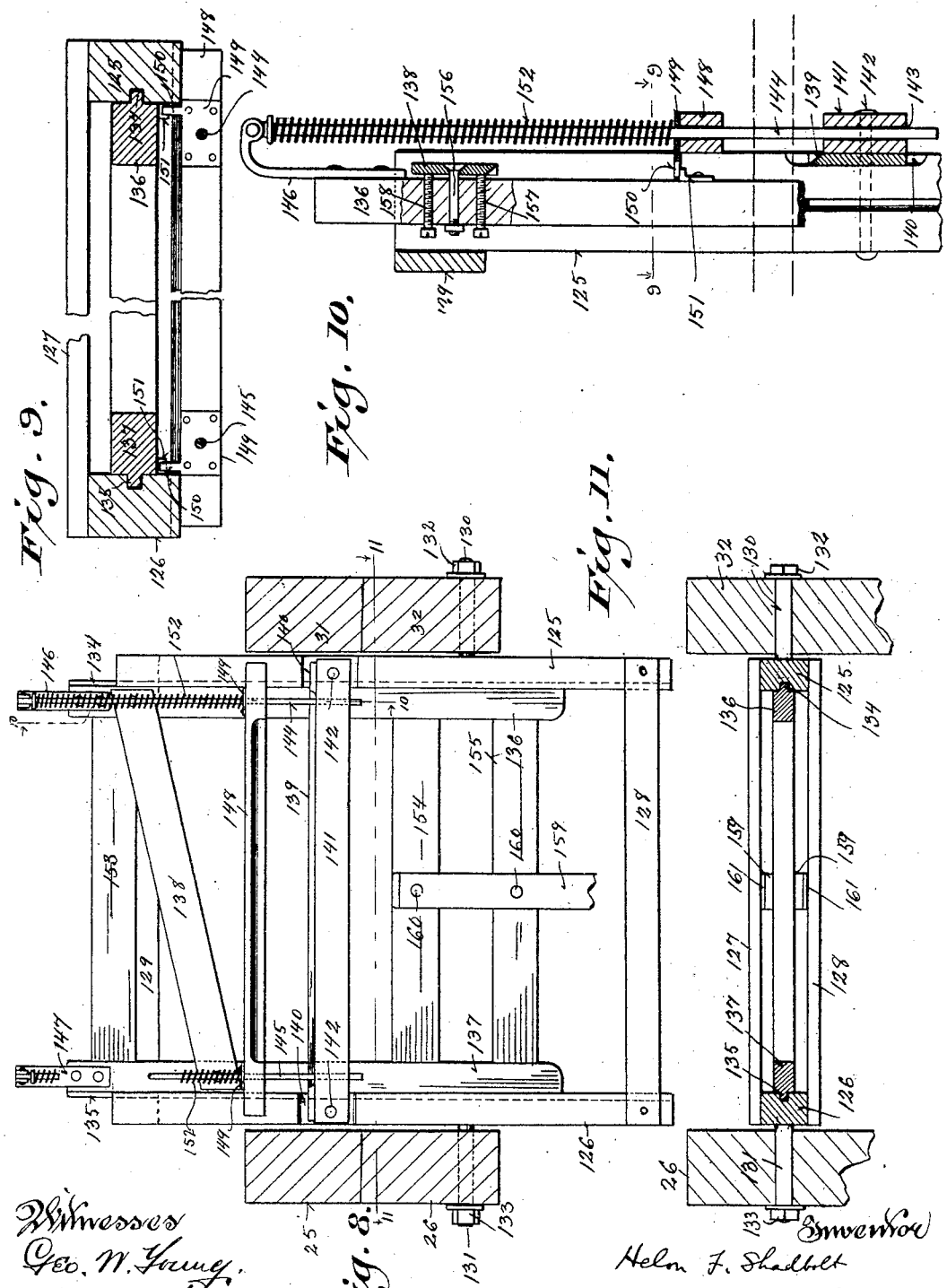

No. 803,718. PATENTED NOV. 7, 1905.
H. F. SHADBOLT.
MACHINE FOR THE MANUFACTURE OF EXCELSIOR WRAPPERS AND PADS.
APPLICATION FILED NOV. 29, 1904.

8 SHEETS—SHEET 7.

Witnesses:
Geo. W. Young.
George Felber.

Inventor
Helen F. Shadbolt
By H. G. Underwood
Attorney

No. 803,718. PATENTED NOV. 7, 1905.
H. F. SHADBOLT.
MACHINE FOR THE MANUFACTURE OF EXCELSIOR WRAPPERS AND PADS.
APPLICATION FILED NOV. 29, 1904.
8 SHEETS—SHEET 8.
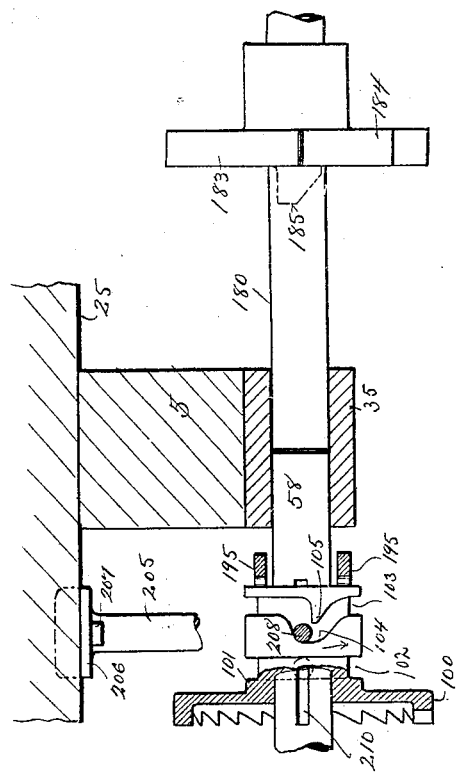
Fig. 14.
Fig. 13.
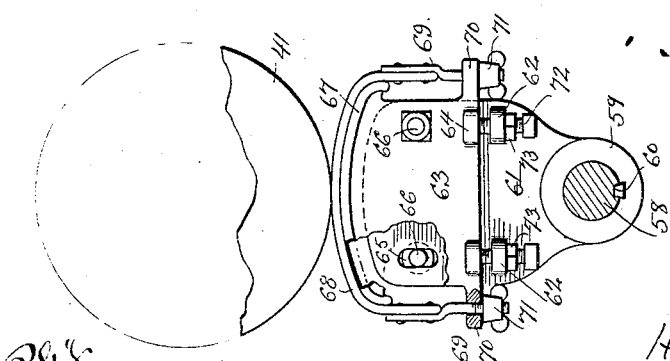
Witnesses
Geo. W. Young.
George Felber.
Inventor
Helon F. Shadbolt
By H. G. Underwood
Attorneys

UNITED STATES PATENT OFFICE.

HELON F. SHADBOLT, OF SHEBOYGAN, WISCONSIN, ASSIGNOR TO EXCELSIOR WRAPPER COMPANY, OF SHEBOYGAN, WISCONSIN.

MACHINE FOR THE MANUFACTURE OF EXCELSIOR WRAPPERS AND PADS.

No. 803,718.      Specification of Letters Patent.      Patented Nov. 7, 1905.

Application filed November 29, 1904. Serial No. 234,769.

*To all whom it may concern:*

Be it known that I, HELON F. SHADBOLT, a citizen of the United States, and a resident of Sheboygan, in the county of Sheboygan and State of Wisconsin, have invented certain new and useful Improvements in Machines for the Manufacture of Excelsior Wrappers and Pads; and I do hereby declare that the following is a full, clear, and exact description thereof.

My invention relates to the manufacture of excelsior wrappers and pads and the like; and it consists in the peculiarities of construction and combination of parts of certain mechanism for accomplishing this purpose, being in part an improvement on the devices set forth in my prior Letters Patent, No. 570,236, granted to my assignee, the Excelsior Wrapper Company, on October 27, 1896, the present improvements more particularly relating to the mechanism at the discharge end of the machine, where the completed wrapper is cut into sections of the desired length, and to the construction of the cutting mechanism, all as will be more fully set forth hereinafter in connection with the accompanying drawings and subsequently claimed.

Figure 1:
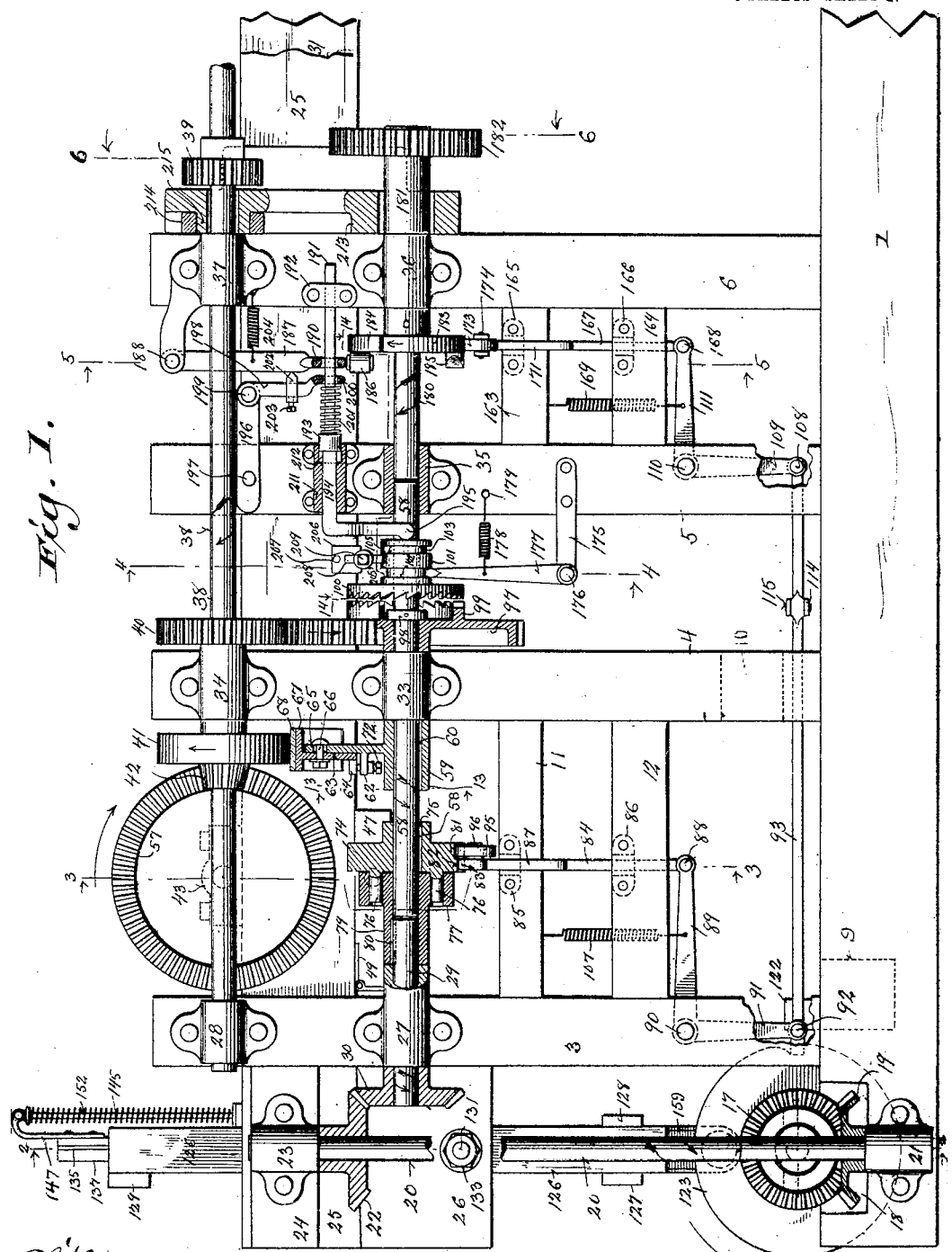
Figure 12:
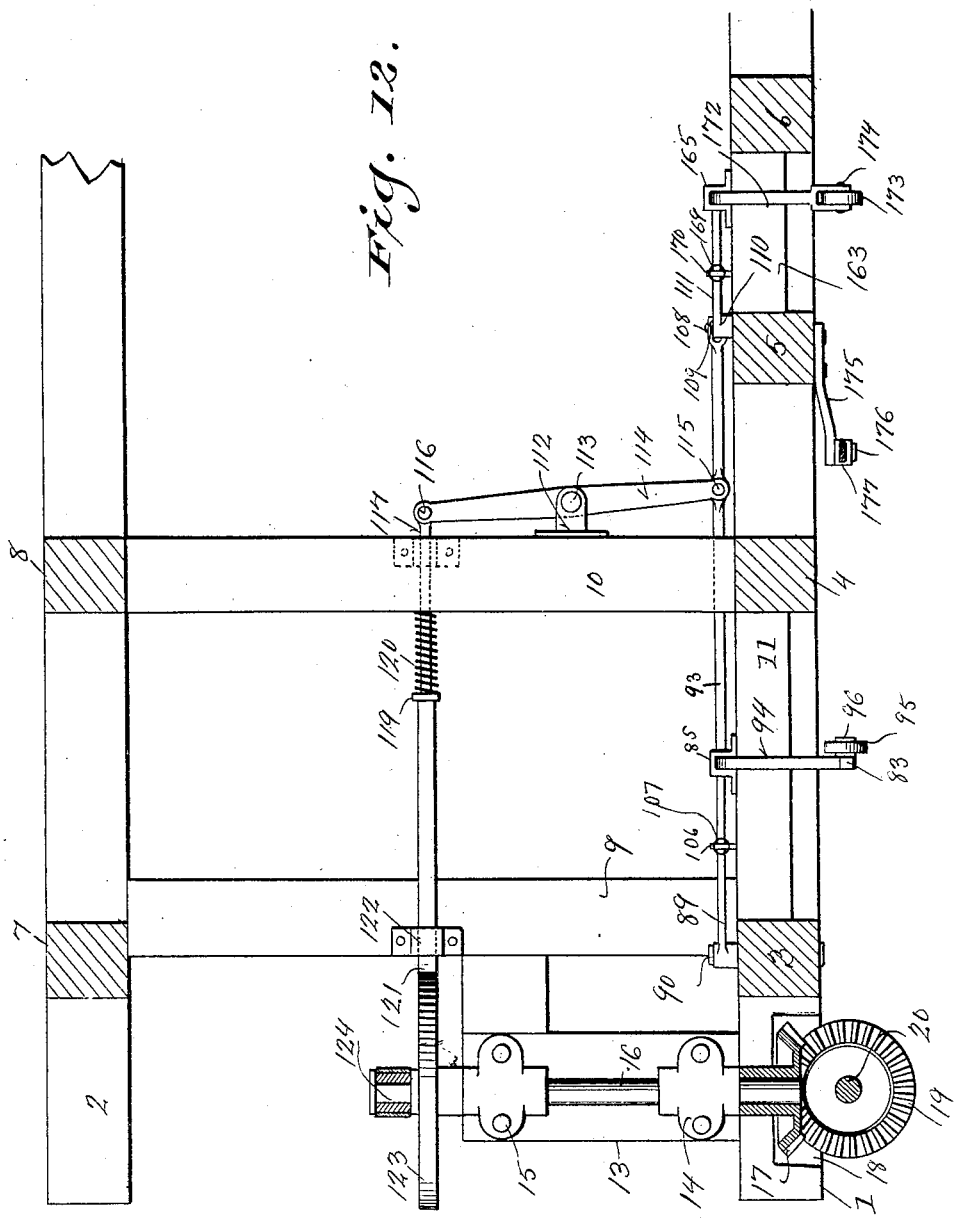

In the said drawings, Figure 1 is a view in side elevation of the said discharge end of the machine, partly broken away or in section, to better illustrate certain details of construction. Fig. 2 is a vertical transverse sectional view taken on the plane indicated by the line 2 2 in Fig. 1. Figs. 3, 4, 5, and 6 are likewise vertical sectional views taken on the planes indicated by the lines 3 3, 4 4, 5 5, and 6 6 of Fig. 1 looking in the directions indicated by the arrows. Fig. 7 is a detail view, partly in elevation and partly in vertical longitudinal section, on the plane indicated by the line 7 7 in Fig. 2. Fig. 8 is a detail view, likewise partly in elevation and partly in transverse vertical section, on the plane indicated by the line 8 8 in Fig. 7. Fig. 9 is a detail horizontal sectional view taken on the line 9 9 of Fig. 10. Fig. 10 is a detail view, partly in vertical section, on the line 10 10 of Fig. 8. Fig. 11 is a detail horizontal sectional view taken on the line 11 11 of Fig. 8. Fig. 12 is a plan view of the bottom part of the machine, partly in section. Fig. 13 is a detail view, partly broken away or in section and looking in the direction of the arrows on line 13 13 of Fig. 1. Fig. 14 is a detail plan view, partly in section, on the line 14 14 of Fig. 1. Fig. 15 is a detail view illustrating the contact of a disk-pin and roller shown in Fig. 5 in the operation of the clutch mechanism shown in Fig. 1.

Referring by numerals to the drawings, 1 2 designate the outer longitudinal sills of the machine, and 3 4 5 6 are uprights rising from the sill 1, there being shown in Fig. 12 similar uprights 7 8 rising from the sill 2 on the opposite side of the machine. A cross-timber 9 connects the two sills near the ends thereof, and another cross-timber 10 connects the uprights 4 and 8 at a higher plane than that of cross-timber 9. Longitudinal brace-timbers 11 12 connect the uprights 3 4. At right angles to the sill 1 is a timber 13, supporting boxes 14 15, which carry a short transverse shaft 16, to the outer end of which is secured a miter gear-wheel 17, (the sill 1 being recessed or cut out, as best shown at 18 in Fig. 2, to receive the same,) which gear-wheel 17 meshes with a like gear 19 on a vertical shaft 20, whose lower end is supported in box 21, secured to the outer surface of sill 1, while the upper end of shaft 20 carries a miter gear-wheel 22, above which said upper end of shaft 20 is supported by box 23, secured to a short timber 24, forming a part of the main frame, as hereinafter described.

25 designates one of the longitudinal upper timbers of the main frame, and a block 26 comes against the under side of said timber 25, to which it is rigidly secured, as by bolting. This block also comes against upright 3, and the short timber 24 is bolted to said timber 25, as well as to said upright, so as to make the frame very rigid. The upright 3 has two boxes 27 28 secured thereto, and box 27 carries a short shaft 29, which at its outer end has fast thereto a miter gear-wheel 30, which meshes with the gear-wheel 22, already named.

31 designates the upper longitudinal timber on the other side of the machine, and 32 the block secured to the under side thereof.

I have not deemed it necessary to show all the bolts which connect the parts named, as this would only obscure the drawings.

33 34 designate boxes on the upright 4, 35 a box on the upright 5, and 36 37 boxes upon the upright 6. The main drive-shaft 38 is supported in the upper boxes 28 34 37 on the uprights above named, the said drive-shaft carrying pinions 39 and 40 and friction-disk 41, the latter having pinion 42 rigid therewith, for purposes hereinafter described. The longitudinal timbers 25 and 31 are provided with boxes 43 and 44, respectively, for the reception of a transverse shaft 45, which carries a feed-roller 46, and to the under side of these timbers 25 and 31 are blocks 47 and 48, hinged to the timbers, as shown at 49 and 50. These blocks have holes bored transversely therethrough for the reception of a transverse shaft 51, which carries another feed-roller 52, the lower feed-roller yielding slightly when the material is passing through between the rollers, and the hinged blocks 47 48, which are held to the timbers above by screws 53 53 on each side of the shaft 51, are enabled to yield by reason of the rubber blocks 54 54 between the under side of the blocks and heads of the screws, said screws passing through enlarged holes in the said blocks to permit a slight play, all as clearly indicated in dotted lines in Fig. 7, this being the same construction as in my prior patent hereinbefore referred to.

The transverse shafts 45 and 51 carry at their ends at one side of the machine the gear-wheels 55 56, which are in mesh and which have long teeth to prevent separation when the lower feed-roller 52 is depressed by the passage of material through the rollers, and the upper shaft 45 has fast to its opposite end the gear 57, which meshes with the hereinbefore-named pinion 42 on the friction-disk 41.

58 is a shaft-section which is supported in the box 33 on upright 4 in line with the shaft 29, hereinbefore named. On one side of the said upright 4 the said shaft is keyed to the hub 59 of a friction-saddle, as best shown at 60 in Fig. 13. This saddle has a rigid upright 61 rising from the said hub 59, with lateral lugs 62 62, and above this is a slide-piece 63, with lateral lugs 64 64 in line with the said lugs 62. The upright 61 is shown with vertical slots 65 therethrough, and screws or bolts 66 serve to hold the upright and slide together and yet permit the movement of the latter. The top of the slide 63 has a flange 67 formed thereon, and a strip of leather 68 is drawn over said flange, the ends of the leather being here shown as riveted to screw-rods 69, passing through holes in end lugs 70 of the slide 63, beneath which said screw-rods receive thumb-nuts 71 to draw the leather tightly down on the flange 67. In some instances only one of these tightening-rods 69 and attachments may be used, the other end of the leather strip 68 being simply riveted to the slide 63; but the construction shown would give a more even pull to the leather. The lugs 62 62 have screw-threaded bores to receive set-screws 72 72, which bear against the lugs 64 64 to raise the slide 63 when the leather 68 becomes worn by frictional contact with the friction-disk 41, jam-nuts 73 73 being preferably used to secure the slide in its adjusted position. The described slots may be in either the upright 61 or slide 63, and bolts with nuts may be used to hold the said two parts together or cap-screws passing through the slots in one part and screwing into the other part, as preferred, in any given instance.

74 designates a disk keyed to shaft 58, as shown at 75, which disk is provided with laterally-projecting pins 76 76 and forms part of a compensating coupling, the other part consisting of the hub 77, loose on said shaft 58 and provided with arc slots 78 78 for the reception of the said pins 76 76, and a sleeve portion 79, the farther end of which receives and is keyed at 80 to the inner end of the before-named shaft 29. The disk 74 has a smooth periphery except at one point, where it has a rounded notch 81 and next thereto a squared notch 82, the latter being for the reception of a squared pin 83 at the end of the upper horizontal portion 94 of a vertically-reciprocating lever 84. This lever is shown as having a vertical portion which has movement in keepers 85 86 on the braces 11 12 and a looped portion 87 surrounding brace 11. The lower end of lever 84 is pivoted, as shown at 88, to one arm 89 of a bell-crank lever, which is pivoted on bolt 90 (which extends through upright 3) and whose lower arm 91 is pivotally connected, as shown at 92, to one end of a connecting-rod 93. The hereinbefore-named lever 84 at the end of its upper horizontal portion 94 has a roller 95, supported on pivot-bolt 96 and next to the described squared pin 83, which roller at the same time that the pin 83 enters the squared notch 82 in the disk 74 will enter the rounded notch 81 in the said disk. The other end of the shaft 58 extends beyond box 33 and enters box 35 on the upright 5. Just beyond the box 33 there is a gear 97, loose on the shaft 58 and held in place thereon by a collar 98, said gear having integral therewith the left-hand member 99 of an annular toothed clutch, the right-hand member 100 of which clutch is formed integral with a sleeve 101, (best shown in Fig. 14,) which has first a straight annular groove 102 and then another annular groove 103, which extends around the sleeve in a straight line for three-fourths of its distance and then has an inward curve toward the first-named groove, as shown at 104, in one wall, while the other wall of said groove has a corresponding projection, as shown at 105.

From a pin 106 on the brace 11 a spiral spring 107 extends to the upper arm 89 of the hereinbefore-named bell-crank lever, whose lower arm 91 is pivotally connected, as described, to the connecting-rod 93, which latter extends and is pivotally connected at 108 to the lower end of the lower arm 109 of another bell-crank lever, pivotally connected at 110 to upright 5 and having an upper arm 111. The before-named cross-beam 10 has secured thereto a hanger 112, which is pivotally connected, as shown at 113, to the center of a lever 114, one end of which is pivotally connected, as at 115, to the said connecting-rod 93, while the other end of lever 114 is pivotally connected, as at 116, to a rod 117, supported in box 118, which is secured to cross-beam 10. The rod 117 is here of reduced diameter, and between said box and a collar 119 on the rod is surrounded by a spiral spring 120. From the collar to the other end the said rod is of increased diameter and terminates in a squared end 121, which passes through box 122 to engage at the proper time with a squared notch in the periphery of the crank-disk 123 on the end of shaft 16.

The crank-disk 123 is provided with a crank-pin 124 for the operation of the cutting mechanism, as presently described. 125 126 designate the vertical side bars of the sash-frame of the cutting mechanism, said side bars being connected together by two lower horizontal bars 127 128 and one upper horizontal bar 129. This sash-frame is suspended by means of bolts 130 131, secured through the depending blocks 32 36 and having smooth inner ends which enter holes in the side bars 125 126 and form the pivotal points on which the sash-frame swings, there being jam-nuts 132 133 on the outer ends of said bolts. The side bars of the sash-frame are formed with central longitudinal grooves on their inner opposed faces for the reception of corresponding longitudinal tongues 134 135 on the side bars 136 137 of the sash, which carries the angular knife-blade 138. The stationary horizontal knife-blade 139 is received in recesses 140 140 cut in the side bars 125 126 of the sash-frame, and then a bar 141 is placed against the blade 139 (said blade and bar extending across the sash-frame) and the parts secured in place by bolts 142, the said bar 141 being provided near each end with vertical bores 143 therethrough for the passage of the guide-rods 144 145. The guide-rods are pivotally connected at their upper ends with arms 146 147, secured to and rising from the sash side bars 136 137, and their lower ends pass through bores in the ends of a presser-bar 148, and thence down through bores 143 in bar 141, as hereinbefore stated. 149 149 designate plates on the said presser-bar, having inwardly-projecting lugs 150 150, which rest upon brackets 151 151 upon the sash side bars 136 137, while the said rods 144 145 above these plates 149 are surrounded by spiral springs 152 152. The side bars 136 137 of the sash are united near the top by the upper cross-bar 153 and by two lower cross-bars 154 155. The angular knife-blade 138 is adjustably held to the sash side bars 136 137 by series of screw-bolts 156 157 158, bolt 156 being at the center to draw the knife-blade against the bar and hold it with a nut, while bolts 157 and 158 on the opposite sides of bolt 156 pass through the bar and bear against the other side of said blade, all as best shown in Fig. 10.

159 designates a stick of timber sawed out at its upper end to straddle the described cross-bars 154 155, to which it is secured by flush-head rivets 160 160, the said timber being preferably lined on its outer surface with thin metal, as shown at 161 161. The lower end of this stick 159 is centrally split and an intersecting transverse bore formed therein, so that this end may be sprung over the described crank-pin 124 on the crank-disk 123, and then the two halves of the lower split end are secured together by bolts 162 162.

Uprights 5 and 6 are connected by two braces 163 164 in line with the previously-named braces 11 and 12, and brace 163 is provided with a keeper 165 and brace 164 with a keeper 166, which receives the straight vertical part of lever 167, whose lower end is pivotally connected, as shown at 168, to the upper bell-crank arm 111, heretofore named, said arm being connected by spiral spring 169 to a pin 170 on brace 163. Lever 167 has a looped portion 171 and horizontal top portion 172, which surround brace 163, and at the forked end of the top portion 172 is a roller 173, pivoted, as shown at 174.

175 represents an arm secured to upright 5 and to which there is pivotally connected, as shown at 176, a lever 177, whose free end is received in the groove 103 of sleeve 101, heretofore named. The lever 177 is here shown as connected by spiral spring 178 to a pin 179 on the upright 5.

180 designates a shaft one end of which is of the same diameter as shaft 58 and, like the latter, is supported in box 35. Shaft 180 continues of same diameter to and through box 36 on upright 6 and then is of greatly-increased diameter, as shown at 181, this enlarged part of the said shaft coming against said box 36 and then continuing to the outer end, where it carries a gear 182, fast on said shaft, but removable, so as to substitute a gear of different diameter when desired, as hereinafter explained. On the other side of box 36 shaft 180 has made fast thereto disk 183, formed with a cam extension 184. This disk 183 carries upon one face and near its periphery, nearly opposite the cam 184, a beveled trip-pin 185, designed to come in contact at the proper time with a roller 186, supported on the lower end of a lever 187, whose upper end is pivoted, as shown at 188, to an arm 189, extending laterally from one of the adjacent uprights, as 6. This lever 187 is formed with an eye or elongated slot 190, through which passes a horizontal rod 191, whose rear end is supported in a keeper 192 on the upright 6, and which rod has an enlargement or collar 193 thereon, beyond which the said rod is increased in diameter and made square, as shown at 194, and then bent downward, as shown at 195, (and preferably divided to form a spanner, as shown in Fig. 14, at 195 195, though it will answer with only one downward portion 195,) said described portion or portions 195 being designed for contact with the hereinbefore-named sleeve 101 at the proper time.

196 designates an arm secured, as shown at 197, to the upright 5 and projecting back toward the lever 187. From the end of arm 196 there depends a short bent lever 198, pivoted at 199 to said arm 196, which has at its lower end a ring or eye 200, through which the hereinbefore-named rod 191 passes and which rod between this point and the collar 193 is surrounded with a stout spiral spring 201. Slidable on lever 198 is a fulcrum-piece 202, which can be held at any point to which it is adjusted by set-screw 203. The lever 187 is connected to a pin on the upright 6 by a spiral spring 204.

205 designates an arm secured by bearing 206 and bolt 207 to the hereinbefore-named longitudinal upper timber 25, as best shown in Figs. 1, 4, and 14. This arm has a vertical bore therethrough adjacent to its outer or free end for the reception of a pin 208, which is held in place by set-screw 209, so as to be received in the annular groove 103 of the described sleeve 101. 210 represents a feather which is let into shaft 58, and there is a corresponding groove in the wall of the bore of the sleeve 101, so that said sleeve may be guided longitudinally in its movement on said shaft, but be incapable of independent rotation thereon. The hereinbefore-named squared portion 194 of rod 191 passes through the bore of box 211 on the upright 5, which bore is enlarged, as shown at 212, at one end to receive the collar 193 on said rod.

213 represents a supporting-frame secured by bolts, as shown, to the upright 6 and to the timber 25. 214 is the adjusting-lever, which is fulcrumed on an upper hub 215 of the frame 213, as shown in Fig. 1. The pinion 39 on the driving-shaft 38 always remains unchanged; but it is in mesh with a gear 216, which, with its integral pinion 217, may be removed and another gear and pinion substituted or the said gear and pinion reversed, so that the pinion 217 may be in mesh with the said fixed pinion 39, this being made possible by slot 218 in the lever 214, and similarly gear 182 on the reduced end of shaft 181 may be removed and a gear of different diameter substituted, these changes being to permit wrappers or pads of different lengths to be manufactured, as in my prior patent hereinbefore named, the adjusting-lever 214 being moved, as required, by loosening bolt 220 and moving same in the arc slot 221 in the frame 213 and then after the gears have been adjusted tightening the parts together by nut 222 on said bolt, substantially as in said prior patent just referred to herein, and at the same time loosening bolt 224 in an upper arc slot 223 of the said lever 214 and after adjustment tightening the parts by means of the nut 225.

The operation of this device will readily be understood from the foregoing description, taken in connection with the accompanying drawings. The present machine, so far as the excelsior-feeding devices, the paper-rolls and paper-folding devices, and the gluing devices and the accessories and adjuncts thereto, is substantially as shown and described in my said prior patent hereinbefore referred to, and therefore I have not deemed it necessary to reproduce the drawings and description of said parts on the farther side or beyond the former-tube 229 and mandrel 226. (Shown in Fig. 7.) When the combined paper and excelsior mat (from which the wrappers and pads are cut) is made in a continuous length, as in said prior patent, the said mat 219 passes between the feed-rollers and over a guide-board 227 (supported on cleats 228, secured to the longitudinal upper timbers 25 and 31 and extending between the same) and is fed over the stationary knife 139 to be cut into suitable lengths, as hereinafter described. Heretofore as the said continuous mat was being severed into lengths it was moving against a stationary cutting-frame, and hence as the knife was cutting through the mat the latter was buckling up against the cutting-blade, resulting in an uneven ragged end, as the paper covering of the mat would be torn, the glued union of paper and excelsior broken, and the latter bunched up at one side to some extent; but all this is obviated by the construction herein illustrated and described, owing to the swing or oscillation of the said frame and sash at just the proper times in connection with the corresponding movement of the various parts of the machine.

The length of the section of the mat cut off at each revolution of the crank-disk 123 is determined by the diameter and number of teeth of the gear 182. The drawings represent the machine with the several operating devices out of engagement with each other and just after a length has been severed. Of course the driving-shaft 38 is in continuous rotation as the cam-disk 183 revolves in the direction of the arrow. The cam 184 on the periphery of said disk engages with roller 173, and thereby depresses lever 167 and the outer end of the upper arm 111 of the connected bell-crank, thus forcing the lower end of the lower arm 109 of said bell-crank toward the discharge end of the machine and likewise forcing connecting-rod 93 in the same direction. This results in reversing the ends of the lever 114, (shown in Fig. 12,) so that the farther end of said lever draws the end of rod 117 (pivoted at 116) away from cross-beam 10, and consequently withdraws the squared end 121 of said rod from its engagement within the notch in crank-disk 123, and at the same time this described movement of connecting-rod 93 through bell-crank 91 89 draws down lever 84 and withdraws the squared pin 83 on said lever from engagement with the squared notch 82 of the pin-disk 74 on the shaft 58, thereby unlocking said disk, as well as the crank-disk 123, as just described. As the cam-disk 183 continues to revolve its bevel trip-pin 185 engages with the roller 186 at the lower end of lever 187, which forces the lever 187 against the fulcrum-piece 202 on the bent lever 198, causing the lower end of lever 198 to press against the spring 201 on rod 191, and the spring bears against the collar 193 on said rod, and thus forces the squared end 194 of the rod and the connected end or spanner 195 against the sleeve 101, causing the latter to move (on the feather 210) along the shaft 58, so that the teeth of the clutch member 100 on said sleeve will engage with the teeth on the other clutch member 99, which is integral with the gear 97, loose on said shaft 58. When the members of the clutch are thus united, the shaft 58 is rotated from the pinion 40 on the driving-shaft 38, as the gear 97 is now by the union of the clutch members made fast on said shaft 58, and the pin-disk 74, fast on said shaft 58, is rotated to bring the pins 76 to the opposite ends of the arc slots 78 78 of the hub 77 of the other part 79 of the compensating coupling by the time the clutch members have full engagement with each other. The shaft 58 begins to turn as the clutch-teeth touch each other; but their full engagement is desirable before the clutch takes on the load of operation to avoid breaking the teeth. When the shaft 58 is coupled by the pin-disk 74 and sleeve 79, as described, to the short shaft 29, (which is fast to said sleeve 79,) the miter gear-wheel 30, fast on the outer end of shaft 29, engages with miter gear-wheel 22, fast on vertical shaft 20, and the miter gear-wheel 19, also fast on shaft 20, engages with like wheel 17, fast on transverse horizontal shaft 16, to the other end of which crank-disk 123 is secured. As this crank-disk 123 is thus rotated its crank-pin 124 draws down through timber or connecting-rod 159 on the sash which carries the inclined knife-blade 138, the presser-bar 148, also carried by said sash, first bearing down on the mat 219, (which, as stated, is just above the lower knife-blade 139 in the sash-frame,) and then the knife-blade 138 is drawn down, severing the mat, as the blade 138 shears by blade 139.

In Fig. 7 the connecting-rod 159 and the sash-frame and sash are all shown at rest in a vertical position with the crank-pin 124 and knife 138 at their highest points. Now as the said crank-disk 123 begins to revolve in the direction of the arrow the lower end of rod 159 is carried down and outward by crank-pin 124 to the point 230 on the disk, when the connecting-rod, sash-frame, and sash will stand, as shown in the oblique dotted line A A in Fig. 7, with the presser-bar 148 and knife-blade 138 brought down to just above the mat 219, as already stated.

Just as the knife begins to cut the mat the crank-pin 124 would be in the position indicated by the dot 230 on the crank-disk 123 in Fig. 7, the said crank-disk continuing to revolve in the direction of the arrow shown thereon, and the knife 138 continuing to descend till the crank-pin 124 has moved to the position indicated by the dot 231, at which time the said knife has finished its cut and descent and commences to rise by reason of the connecting-rod 159 now carrying upward the sash on which said knife is supported. The knife-carrying sash, as heretofore stated, has reciprocative movement in the side bars 125 126 of the sash-frame, and the latter is pivotally suspended by the bolts 131 132 from the hanger-blocks 26 32, and hence as the knife 138 begins to cut the mat 219 is advancing all the time, and the upper end of the sash-frame swings outwardly all this time until the crank-pin 124 has reached the point 232, completing a half-revolution of the crank-disk 123 from the point 230 and then the connecting-rod, sash-frame, and sash are in the opposite oblique position (as indicated by the dotted lines B B in Fig. 7) to that described when the knife 138 begins to cut the mat. As the disk 123 continues to revolve the knife 138 and presser-bar 148 rise, and as the crank-pin 124 reaches its original position (shown in full lines in Fig. 7) the advancing mat again travels over the lower stationary knife 139, and the just-described cutting operation is repeated once for every complete revolution of the crank-disk 123 and this without any obstruction to the travel of the mat, the cut being therefore clean and straight each time.

The function of the springs 152 152 on the rods 144 145, which pass through the presser-bar 148 and through the bar 141, which is against the stationary lower knife 139, is to hold the said presser-bar against the mat 219 while the latter is being cut.

The operation of my machine in uniting the clutch members and the parts of the compensating coupling has been fully described, and I will now explain how the separation of the clutch members is brought about after the cut of the mat has been completed. With the machine running at a moderate rate of speed momentum cannot be depended upon for this service. Just before the completion of the revolution of the crank-disk 123 the stationary pin 208 is in the straight part of groove 103 of sleeve 101, and as said sleeve revolves the projection 105 of the groove-wall encounters the pin, which thus guides the sleeve until the pin is first received in the inward-curved recess 104 in the part opposite the projection 105, which thus causes the sleeve to draw clutch member 100 away from member 99. At this time the friction-disk 41 on the main driving-shaft 38 is in contact with the leather-covered flange of the friction-saddle, as shown in Figs. 1 and 13, and thereby the shaft 58 is rotated until the sleeve 101, feathered thereto, is moved, so that the pin 208 is against the extreme limit of the curved recess 104 in said sleeve, as shown in Fig. 14, which still further separates the two clutch members and places them in the original position ready to be reunited, as first described. The various springs 107, 120, 169, and 204 automatically restore the parts to which they are connected to their original normal positions after said parts and their attachments have been operated as already described, while spring 178 is merely to retain the sleeve 101 (through lever 177) in proper position against pin 208.

With my present machine there is practically no limit to the length of the wrappers or pads that may be cut from the continuous mat, save the limit of commercial adaptability, and it will operate equally as well for long as for short sections, this being merely a matter of adjustment of gears, as hereinbefore set forth.

A peculiarity and great advantage of my present machine is that while the drive-shaft is always in motion and the forward passage of the mat of material continuous the mechanism for cutting the said mat into lengths is at rest except at the time of cutting, as before described. This lessens the wear and tear of the machine and greatly increases its longevity.

Having thus described my invention, what I claim as new, and desire to secure by Letters Patent, is—

1. In a machine for the manufacture of excelsior wrappers and pads, the combination of a continuous drive and feed mechanism, a clutch-controlled cutting mechanism comprising a suspended oscillative sash-frame carrying a shear-knife, a sash reciprocative in said frame with which it is oscillative, and a shear-knife carried by the sash; clutch-controlled mechanism for actuating the cutting mechanism, and means for intermittent automatic clutching and unclutching of said cutting mechanism with respect to the drive mechanism.

2. In a machine for the manufacture of excelsior wrappers and pads, the combination with a suitable frame and continuously-moving drive-shaft and feed mechanism, of cutting mechanism and gearing and shafts for operating the same at intervals, a sectional shaft, having a compensating coupling and clutch members for uniting its sections, pinions on said drive-shaft, and on said sectional shaft in mesh with each other, gearing connecting said sectional shaft with one of the before-named shafts, and mechanism for moving the clutch-sections together at predetermined intervals.

3. In a machine for the manufacture of excelsior wrappers and pads, the combination with a suitable frame, and continuously-moving drive-shaft and feed mechanism, of cutting mechanism, and a sectional shaft for operating same at intervals, a clutch member made fast on one section of said shaft, and an intermeshing clutch member made fast on a sleeve sliding on said shaft-section, an annular curved walled groove on said sleeve, a pin in engagement with said groove, a friction-saddle fast on said shaft-section, and a friction-disk on said drive-shaft for engagement with said friction-saddle.

4. In a machine for the manufacture of excelsior wrappers and pads, the combination with a suitable frame, and continuously-moving drive-shaft and feed mechanism, of cutting mechanism and a crank-disk and a sectional shaft for operating same at intervals, a cam-disk on said shaft; a trip-pin on said disk, clutch mechanism and compensating coupling for uniting the sections of said shaft at intervals, a push-rod for uniting the clutch mechanism, a lever carrying a roller for engagement with said trip-pin for actuating said push-rod, a series of levers and connecting mechanism for locking the compensating coupling and the crank-disk against motion while the sectional shaft is at rest, and gearing connecting with the drive-shaft for uniting the sections of the sectional shaft, and for unlocking the said locked parts, and operating the cutting mechanism at intervals.

In testimony that I claim the foregoing I have hereunto set my hand, at Sheboygan, in the county of Sheboygan and State of Wisconsin, in the presence of two witnesses.

HELON F. SHADBOLT.

Witnesses:
A. C. PRESCOTT,
LAURA VOGL.